(12) United States Patent
Lee

(10) Patent No.: US 8,926,173 B2
(45) Date of Patent: Jan. 6, 2015

(54) DISTRIBUTED OPTICAL FIBER SENSOR SYSTEM

(75) Inventor: Michael Lee, Chungcheongnam-do (KR)

(73) Assignee: UTO International Corporation, Asan, Chungcheongnam-do (KR)

( * ) Notice: Subject to any disclaimer, the term of this patent is extended or adjusted under 35 U.S.C. 154(b) by 0 days.

(21) Appl. No.: 12/666,378

(22) PCT Filed: Jun. 27, 2008

(86) PCT No.: PCT/KR2008/003724
§ 371 (c)(1),
(2), (4) Date: Nov. 12, 2010

(87) PCT Pub. No.: WO2009/005256
PCT Pub. Date: Jan. 8, 2009

(65) Prior Publication Data
US 2011/0044371 A1 Feb. 24, 2011

(30) Foreign Application Priority Data

Jun. 29, 2007 (KR) .................... 10-2007-0065770

(51) Int. Cl.
G01J 5/08 (2006.01)
G01K 3/14 (2006.01)
G02B 6/00 (2006.01)
G01M 11/00 (2006.01)

(52) U.S. Cl.
CPC ............ G01M 11/39 (2013.01); G01M 11/319 (2013.01)
USPC ............... 374/137; 374/130; 374/161; 374/1; 356/43; 385/12

(58) Field of Classification Search
USPC ......... 374/137, 110, 112, 115, 161, 130–132, 374/120, 141, 45, 1, 142; 385/12; 356/43, 356/486, 498, 4.62, 51
See application file for complete search history.

(56) References Cited

U.S. PATENT DOCUMENTS

| | | | |
|---|---|---|---|
| 4,823,166 A * | 4/1989 | Hartog et al. | 356/44 |
| 5,592,282 A * | 1/1997 | Hartog | 356/44 |
| 7,284,903 B2 * | 10/2007 | Hartog | 374/130 |
| 7,499,151 B2 * | 3/2009 | Bao et al. | 356/35.5 |
| 8,199,317 B2 * | 6/2012 | Habel et al. | 356/32 |
| 8,520,197 B2 * | 8/2013 | Handerek | 356/73.1 |
| 2003/0142392 A1 * | 7/2003 | Strutz et al. | 359/337.2 |
| 2007/0223556 A1 * | 9/2007 | Lee et al. | 374/1 |
| 2008/0025276 A1 * | 1/2008 | Lee et al. | 370/338 |
| 2008/0181554 A1 * | 7/2008 | Taverner et al. | 385/12 |
| 2013/0094011 A1 * | 4/2013 | Barry et al. | 356/4.01 |

* cited by examiner

Primary Examiner — Gail Kaplan Verbitsky
(74) Attorney, Agent, or Firm — Kongsik Kim; Mintz Levin Cohn Ferris Glovsky and Popeo, P.C.

(57) ABSTRACT

A distributed optical fiber sensor system is provided. In this system, backward-scattered light generated in a test optical fiber is filtered to separate the backward-scattered light into Raman scattered light and Brillouin scattered light. The separated Raman scattered light and Brillouin scattered light are each converted into digital data. A change in temperature with respect to the distance of the test optical fiber is measured from the digital data of the Raman scattered light. A change in temperature and a change in the degree of deformation with respect to the distance of the test optical fiber are measured from the digital data of the Brillouin scattered light. The change in temperature and the change in the degree of deformation with respect to the distance of the test optical fiber are separately output using the measured data.

9 Claims, 2 Drawing Sheets

DISTRIBUTED OPTICAL FIBER SENSOR SYSTEM

CROSS-REFERENCES TO RELATED APPLICATIONS

This application is a U.S. national phase application, pursuant to 35 U.S.C. §371 of PCT/KR2008/003724, filed Jun. 27, 2008, designating the United States, which claims priority to Korean Application No. 10-2007-0065770, filed Jun. 29, 2007. The entire contents of the aforementioned patent applications are incorporated herein by this reference.

TECHNICAL FIELD

The present invention relates to a distributed optical fiber sensor system.

Background Art

In general, an optical fiber sensor measures changes in various characteristics of light traveling in an optical fiber that are caused by changes of external physical quantities(signals) applied to the optical fiber. The changes of external physical quantities(signals) applied to the optical fiber include changes of nearly all types of physical qualities such as temperature, pressure, electric field, magnetic field, density of chemical material, and mechanical movement.

The characteristics of light that vary as such external physical quantities change include intensity, phase, polarization, and wavelength and a variety of methods are employed to measure small changes in these characteristics.

More specifically, examples of physical phenomena that cause changes in the characteristics of light include changes of reflective index (associated with temperature, pressure, tension, the density of chemical material, etc.), and changes of polarization (associated with electric field, magnetic field, pressure, etc.), changes in light loss according to wavelength (associated with the density of chemical material, bending, etc.) and also include relativistic phase changes and non-linear phenomena (Raman scattering, Brillouin scattering, Kerr effects, etc.).

The optical fiber sensor has advantages over other types of sensors because of the facts that changes of various physical quantities are measured using light rather than electronic elements and that the measured signal is also carried through light.

First, since the optical fiber sensor includes no conductor that passes electricity, the optical fiber sensor causes no noise due to electromagnetic interference and is also free of the risk of occurrence of grounding, leakage of electricity, electric shock, etc.

In addition, it is easy to attach the optical fiber sensor to a surface of a measurement target and to bury the optical fiber sensor in the ground since the optical fiber sensor is small in size and weight and also has high corrosion resistance since the material of the optical fiber sensor is glass.

Further, the optical fiber sensor can be used for measurement of nearly all types of physical quantities and guarantees very high sensitivity since the optical fiber sensor performs measurement using light of a very short wavelength.

Furthermore, since the optical fiber sensor causes a very small optical loss and has a wide bandwidth for information transmission as in the case of communication, it is possible to implement an array-type sensor which is constructed by connecting a large number of sensors to a single optical fiber so that the sensors can perform simultaneous measurement. The array-type sensor can perform remote measurement even at a distance of tens of kilometers and can also perform distributed measurement to measure a distribution of physical quantities with respect to position.

Optical fiber sensors are classified into interference, wavelength, and scattering-type sensors. The scattering-type sensor measures light scattered backward in an optical fiber, which changes according to an external physical quantity applied to the optical fiber, using pulse light that travels in the optical fiber. This enables measurement of a distribution of physical quantities over the entirety of a long-distance optical fiber.

The sensor that measures backward-scattered light using pulse light is referred to as an "Optical Time Domain Reflectometry (OTDR) sensor". Most scattering-type optical fiber sensors basically use OTDR technology.

DISCLOSURE OF INVENTION

Technical Problem

Such scattering-type optical fiber sensors are divided into a Rayleigh scattering-type optical fiber sensor, a Raman scattering-type optical fiber sensor, and a Brillouin scattering-type optical fiber sensor.

The Rayleigh scattering-type optical fiber sensor is a sensor that measures scattered light that is generated as pulse light travels in an optical fiber, the density of which is unevenly distributed. Thus, the Rayleigh scattering-type optical fiber sensor obtains backward-scattered light, the intensity of which is proportional to that of the pulse light.

For example, when the optical fiber is bent by an external factor for measurement, light traveling in the optical fiber leaks to the outside and thus the intensity of backward-scattered light decreases. While the Rayleigh scattering-type optical fiber sensor utilizes this phenomenon, this sensor is not sensitive to changes in external temperature or changes in the degree of deformation and can be applied only when special optical fiber bending has occurred.

Both the Raman and Brillouin scattering-type optical fiber sensors use nonlinear light scattering. The Raman scattering-type optical fiber sensor is widely used for temperature measurement since the intensity of Raman scattered light varies sensitively only with external thermal changes.

That is, the Raman-scattered signal is a backward-scattered signal that is generated due to molecular vibrations when light propagates in an optical fiber. The characteristics of molecular vibrations in the optical fiber are changed only by temperature.

On the other hand, the Brillouin scattering-type optical fiber sensor uses the fact that the natural Brillouin frequency of an optical fiber varies depending on temperature and the degree of deformation externally applied to the optical fiber. The Brillouin scattering-type optical fiber sensor obtains such a Brillouin frequency change to measure the absolute amount of change in an external physical quantity (temperature and the degree of deformation).

That is, Brillouin scattering occurring in an optical fiber causes light traveling in the optical fiber to interact with acoustic phonons to produce a backward-scattered signal, which carries information regarding temperature and the degree of deformation proportional to the characteristics of an environment in which the optical fiber is located.

Although the Brillouin scattering-type optical fiber sensor has an advantage in that it can simultaneously measure the degree of deformation and temperature as described above, it has a problem in that it cannot separately identify information regarding temperature and information regarding the degree of deformation in the backward-scattered signal.

Technical Solution

Therefore, it is an object of the present invention to provide a distributed optical fiber sensor system wherein backward-scattered light generated in a test optical fiber is separated into Raman scattered light and Brillouin scattered light using an optical filter unit, the Raman scattered light and the Brillouin scattered light separated through the optical filter unit are each converted into digital data, and a change in temperature and a change in the degree of deformation with respect to a distance of the test optical fiber are separately output using the digital data.

Advantageous Effects

As described above, backward-scattered light generated in a test optical fiber can be separated into Raman scattered light and Brillouin scattered light using an optical filter unit, the Raman scattered light and the Brillouin scattered light separated through the optical filter unit can each be converted into digital data, and a change in temperature and a change in the degree of deformation with respect to a distance of the test optical fiber can be separately measured using the digital data.

That is, a change in temperature and a change in the degree of deformation with respect to the distance of a test optical fiber can be separately measured using a single sensor system without the need to separately provide a sensor for measuring a change in temperature with respect to the distance of the test optical fiber and a sensor for measuring a change in the degree of deformation with respect to the distance.

DESCRIPTION OF REFERENCE NUMERALS OF MAIN PARTS OF THE DRAWINGS

Figure 1:
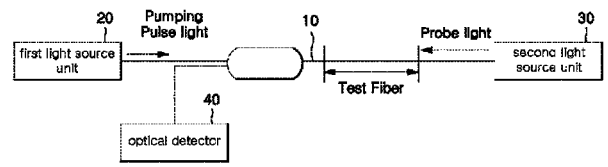
FIG. 1 illustrates a basic concept of a distributed optical fiber sensor system of the present invention.

110: first light source unit 120: first modulator
130: pulse generator 140: amplifier
150: test optical fiber 160: second light source unit
170: second modulator 180: RF signal generator
190: optical circulator 200: optical filter unit
210: first optical detector 220: second optical detector
230: optical signal meter

BEST MODE FOR CARRYING OUT THE INVENTION

In accordance with a preferred embodiment of the present invention, there is provided a distributed optical fiber sensor system including a first optical modulator for modulating light output from a first light source unit into pumping pulse light and transmitting the pumping pulse light to one end of a test optical fiber, a second optical modulator for modulating light output from a second light source unit into probe light and transmitting the probe light to the other end of the test optical fiber, an optical circulator for diverging backward-scattered light that is generated in the test optical fiber, an optical filter unit for passing Raman scattered light and Brillouin scattered light included in the backward-scattered light diverged at the optical circulator, and a physical quantity change measurement unit for converting each of the Raman scattered light and the Brillouin scattered light that have passed through the optical filter unit into digital data and separately measuring a change in temperature and a change in the degree of deformation with respect to a distance of the test optical fiber using the digital data.

In accordance with another preferred embodiment of the present invention, there is provided a distributed optical fiber sensor system including an optical modulator for modulating light output from a light source unit into pumping pulse light and transmitting the pumping pulse light to a test optical fiber, an optical circulator for diverging backward-scattered light that is generated in the test optical fiber, an optical filter unit for passing Raman scattered light and Brillouin scattered light included in the backward-scattered light diverged at the optical circulator, and a physical quantity change measurement unit for converting each of the Raman scattered light and the Brillouin scattered light that have passed through the optical filter unit into digital data and separately measuring a change in temperature and a change in the degree of deformation with respect to a distance of the test optical fiber using the digital data.

In accordance with another preferred embodiment of the present invention, there is provided a distributed optical fiber sensor system including a splitter for diverging light output from a light source unit, a first optical modulator for modulating the light diverged at the splitter into pumping pulse light, a second optical modulator for modulating the light diverged at the splitter into probe light, an amplifier for amplifying the pumping pulse light and the probe light and transmitting the amplified pumping pulse light and probe light to a test optical fiber, a reflector formed at an end of the test optical fiber to reflect the probe light, an optical circulator for diverging backward-scattered light that is generated in the test optical fiber, an optical filter unit for passing Raman scattered light and Brillouin scattered light included in the backward-scattered light diverged at the optical circulator, and a physical quantity change measurement unit for converting each of the Raman scattered light and the Brillouin scattered light that have passed through the optical filter unit into digital data and separately measuring a change in temperature and a change in the degree of deformation with respect to a distance of the test optical fiber using the digital data.

Here, the optical filter unit includes a Raman reflected filter for reflecting Raman scattered light included in the backward-scattered light diverged at the optical circulator, and a Brillouin pass filter for passing only Brillouin scattered light included in the backward-scattered light that has passed through the Raman reflected filter.

In addition, the optical filter unit includes a Raman pass filter for passing only Raman scattered light included in the backward-scattered light diverged at the optical circulator, a Brillouin pass filter for passing only Brillouin scattered light included in the backward-scattered light diverged at the optical circulator, and a splitter for diverging the backward-scattered light diverged at the optical circulator to the Raman pass filter and the Brillouin pass filter.

Further, the physical quantity change measurement unit includes a first optical detector for detecting Raman scattered light that has passed through the optical filter unit and converting the detected Raman scattered light into digital data and outputting the digital data, a second optical detector for detecting Brillouin scattered light that has passed through the optical filter unit and converting the detected Brillouin scattered light into digital data and outputting the digital data, and an optical signal meter for measuring a change in temperature with respect to the distance of the test optical fiber from the data output from the first optical detector, measuring a change in temperature and a change in the degree of deformation with respect to the distance of the test optical fiber from the data output from the second optical detector, and separately measuring the change in temperature and the change in the degree of deformation with respect to a distance of the test optical fiber using the digital data using the measured data.

MODE FOR THE INVENTION

The distributed optical fiber sensor system of the present invention will now be described in detail with reference to FIGS. 1 to 6. In the following description of the present invention, a detailed description of known functions and configurations incorporated herein will be omitted when it may obscure the subject matter of the present invention. The terms used in the following description were defined taking into consideration the functions obtained in accordance with the present invention. The definitions of these terms should be determined based on the whole content of this specification because they may be changed in accordance with the option of a user or operator or a usual practice.

FIG. 1 illustrates a basic concept of a distributed optical fiber sensor system of the present invention. Brillouin scattering of an optical fiber is a phenomenon in which light incident on an optical fiber interacts with an acoustic phonon generated in the optical fiber and is then scattered at a frequency different from that of the incident light. The frequency difference is referred to as a "natural Brillouin frequency change". The frequency difference significantly depends on the substance of the optical fiber and changes according to the degree of deformation (for example, tension) applied to the optical fiber.

As shown in FIG. 1, a first light source unit 20 and a second light source unit 30, which transmit pumping pulse light and probe light respectively to both ends of an optical fiber 10, are disposed opposite each other.

An optical detector 40 is coupled to the optical fiber 10 to measure changes of an external physical quantity applied to the optical fiber 10 by comparing the frequency of scattered light, which travels backward due to an external physical quantity change in a test portion of the optical fiber 10, and the frequency difference between pumping pulse light and probe light.

Here, when vp is the frequency of the pumping pulse light transmitted by the first light source unit 20 and vcw is the frequency of the probe light transmitted by the second light source unit 30, the frequency difference Δv between the pumping pulse light and the probe light is vp−vcw (i.e., αv=vp−vcw).

If the frequencies of the light source units are adjusted such that the frequency difference αv between the pumping pulse light and the probe light is equal to a Brillouin frequency shift of the optical fiber 10, the pumping pulse light is optical-energy-converted into probe light through derived Brillouin scattering. Accordingly, the probe light is subjected to Brillouin optical amplification in the optical fiber 10, thereby facilitating analysis of Brillouin signals.

When a compressive or tensile deformation has occurred at a specific position of the test optical fiber, backward-scattered light, which is a final received signal of the Brillouin scattering optical fiber sensor, appears in the form of a rapid signal decrease or increase at the position and, from this, it is possible to easily determine both the position at which the deformation has occurred and the extent of the deformation.

Figure 2:
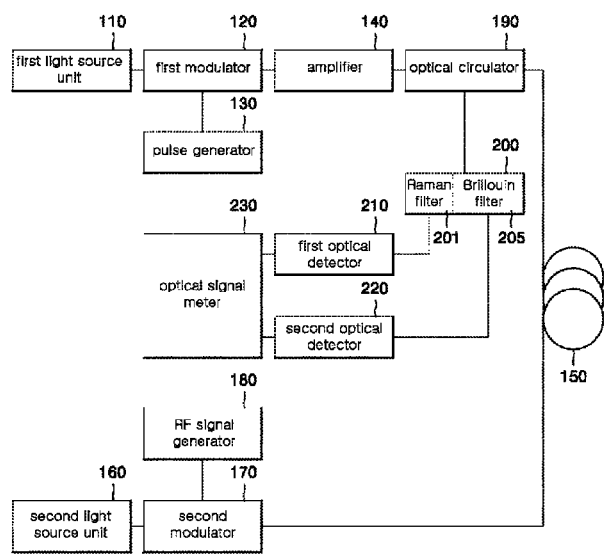
FIG. 2 is a block diagram illustrating a first embodiment of the distributed optical fiber sensor system of the present invention.

FIG. 2 is a block diagram illustrating a first embodiment of the distributed optical fiber sensor system of the present invention.

As shown, the distributed optical fiber sensor system includes a first light source unit 110, a first modulator 120, a pulse generator 130, an amplifier 140, a test optical fiber 150, a second light source unit 160, a second modulator 170, an RF signal generator 180, an optical circulator 190, an optical filter unit 200, a first optical detector 210, a second optical detector 220, and an optical signal meter 230.

The first light source unit 110 outputs light having a high-output thin-beam width. A Distributed Feedback Laser (DFB) is typically used as the first light source unit 110.

The first modulator 120 modulates the light output from the first light source unit 110 into pumping pulse light. Such pulsed-type light is suitable for distributed sensors that measure physical values at a specific position in the entire portion of the optical fiber since pulsed-type light has distance resolution according to the pulse width.

The pulse generator 130 generates a pulse having a predetermined width to modulate the light output from the first light source unit 110 to pumping pulse light.

When pumping pulse light having a pulse width of 30 ns is generated using the first modulator 120 and the pulse generator 130, the distance resolution of the distributed optical fiber sensor system is 3 m.

That is, the distance resolution of the distributed optical fiber sensor system is 3 m since the distributed optical fiber sensor system measures scattered light generated as the pumping pulse light is scattered and reflected while passing through the test portion of the optical fiber and the pulse width "30 ns" corresponds to an optical fiber distance of about 3 m.

The amplifier 140 amplifies the pumping pulse light generated through the modulation of the first modulator 120.

That is, since the intensity of the pumping pulse light output through the first modulator 120 and the pulse generator 130 is small, the pumping pulse light is amplified through the amplifier 140 to facilitate measurement.

Preferably, the amplifier 140 is an Erbium Doped Fiber Amplifier (EDFA), which has advantages in that it has a higher gain than semiconductor laser amplifiers and is not deteriorated even through high-speed signal transmission, and also has a low noise figure.

The test optical fiber 150 is an optical fiber in which backward-scattered light is generated as the pumping pulse light amplified through the amplifier 140 travels.

The second light source unit 160 outputs light, which is used to determine whether or not the central frequency of the pumping pulse light has been shifted, to the test optical fiber 150.

The second modulator 170 modulates the light output from the second light source unit 160 into probe light.

The RF signal generator 180 increases the frequency of the probe light in a stepwise manner to obtain a Brillouin frequency change that causes Brillouin scattering amplification.

Specifically, to obtain a Brillouin frequency change, the RF signal generator 180 operates while changing the frequency in a stepwise manner at predetermined frequency intervals from a first frequency to a last frequency in a preset frequency range.

Using this RF signal generator 180, the second modulator 170 modulates the light output from the second light source unit 160 into probe light.

The optical circulator 190 diverges and outputs light that is scattered in a direction opposite to the travel direction of the pumping pulse light (i.e., light scattered backward in the test optical fiber 150) to the optical filter unit 200.

The optical circulator 190 is disposed between the amplifier 140 and the test optical fiber 150 to prevent part of the pumping pulse light from directly entering the optical filter unit 200 when the pumping pulse light is transmitted to the test optical fiber 150.

The optical filter unit 200 passes only Raman scattered light and Brillouin scattered light included in the light scattered backward in the test optical fiber 150.

More specifically, the optical filter unit 200 includes a Raman filter 201 and a Brillouin filter 205 and the Raman filter 201 passes only light corresponding to Raman scattering included in the backward-scattered light and the Brillouin filter 205 passes only light corresponding to Brillouin scattering included in the backward-scattered light.

For example, the Raman filter 201 passes light having a wavelength of 900-1000 nm included in the backward-scattered light and the Brillouin filter 205 passes light having a wavelength of 1555 nm included in the backward-scattered light.

The first optical detector 210 detects the light that has passed through the Raman filter 201 and performs high-speed analog-to-digital conversion on the detected light, thereby converting the Raman scattered optical signal into a digital signal.

The Raman scattered optical signal includes information of a change in temperature at a specific position of the optical fiber.

The second optical detector 220 detects the light that has passed through the Brillouin filter 205 and performs high-speed analog-to-digital conversion on the detected light, thereby converting the Brillouin scattered optical signal into a digital signal.

The Brillouin scattered optical signal includes information of a change in the degree of deformation and a change in temperature at a specific position of the optical fiber.

The first optical detector 210 and the second optical detector 220 sequentially detect the backward-scattered light in the test optical fiber 150. The reason why the first optical detector 210 and the second optical detector 220 detect the backward-scattered light at different times is to detect a change in temperature and a change in the degree of deformation with respect to the difference of respective distances of positions in the optical fiber.

That is, a change in temperature and a change in the degree of deformation at each position of the optical fiber can be read by detecting the time difference of backward-scattered light.

The optical signal meter 230 controls the overall operation of the distributed optical fiber sensor system of the present invention according to preset basic variables such as an averaging count, a sampling count and a sampling rate, a frequency radiation range, and a step frequency. The optical signal meter 230 receives the digital data of the Raman scattered light and the Brillouin scattered light from the first optical detector 210 and the second optical detector 220 and outputs signals regarding the length of the optical fiber, the optical intensity, and a Brillouin frequency change.

The optical signal meter 230 can obtain information of temperature with respect to the distance from the data of the Raman scattered light received from the first optical detector 210 and can obtain information of the degree of deformation and temperature with respect to the distance from the data of the Brillouin scattered light received from the second optical detector 220. Using this information, the optical signal meter 230 can separately measure the degree of deformation and the temperature with respect to the distance of the test optical fiber 150.

This method is described below with reference to Mathematical Expressions 1 and 2.

$$R_s(i) = T(i) \qquad \text{MATHEMATICAL EXPRESSION 1}$$

$$B_s = T(f) + e(f) \qquad \text{MATHEMATICAL EXPRESSION 2}$$

Mathematical Expression 1 is an equation representing the change in optical intensity (i) with respect to temperature T at each distance when Raman scattered light is measured and Mathematical Expression 2 is an equation representing the change in optical frequency (f) with respect to temperature T and the degree of deformation (e) at each distance when Brillouin scattered light is measured.

Since the temperature term can be commonly measured in Mathematical Expressions 1 and 2, the degree of deformation with respect to the distance can be measured by obtaining the difference between the data received from the first optical detector 210 and the data received from the second optical detector 220.

According to the present invention, as described above, light scattered backward in the test optical fiber 150 is separated into Raman scattered light and Brillouin scattered light through filtering of the optical filter unit 200 and data of Raman scattered light and data of Brillouin scattered light are simultaneously measured through the first optical detector 210 and the second optical detector 220, so that a change in the degree of deformation and a change in temperature with respect to the distance can be separately measured.

Figure 3:
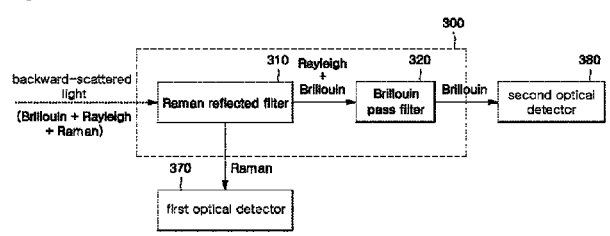
FIG. 3 illustrates an embodiment wherein the optical filter unit of the present invention separates Raman scattered light and Brillouin scattered light.

FIG. 3 illustrates an embodiment wherein the optical filter unit of the present invention separates Raman scattered light and Brillouin scattered light.

As shown, an optical filter unit 300 includes a Raman reflected filter 310 and a Brillouin pass filter 320.

The Raman reflected filter 310 and the Brillouin pass filter 320 may each be implemented as a thin-film filter.

When backward-scattered light diverged at an optical circulator (not shown) is input to the optical filter unit 300, the Raman reflected filter 310 reflects Raman scattered light included in the backward-scattered light to a first optical detector 370.

That is, the backward-scattered light includes a Brillouin scattered light beam, a Rayleigh scattered light beam, and a Raman scattered light beam, and the Raman reflected filter 310 reflects the Raman scattered light beam among these light beams to the first optical detector 370.

The backward-scattered light beams that are not reflected at the Raman reflected filter 310 (i.e., the Brillouin scattered light beam and the Rayleigh scattered light beam) are input to the Brillouin pass filter 320 and the Brillouin pass filter 320 then passes only the Brillouin scattered light beam among the input scattered light beams and transmits the passed Brillouin beam to a second optical detector 380.

Figure 4:
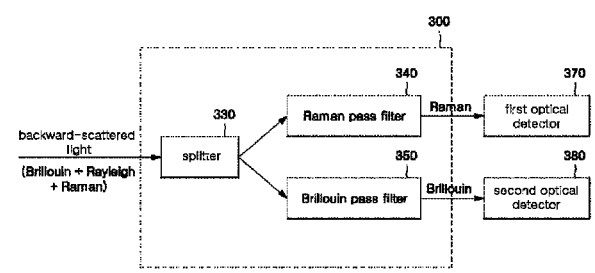
FIG. 4 illustrates another embodiment wherein the optical filter unit of the present invention separates Raman scattered light and Brillouin scattered light.

FIG. 4 illustrates another embodiment wherein the optical filter unit of the present invention separates Raman scattered light and Brillouin scattered light.

As shown, an optical filter unit 300 includes a splitter 330, a Raman pass filter 340 and a Brillouin pass filter 350.

When backward-scattered light diverged at an optical circulator (not shown) is input to the optical filter unit 300, the splitter 330 distributes the backward-scattered light to the Raman pass filter 340 and the Brillouin pass filter 350.

The Raman pass filter 340 passes only a Raman scattered light beam included in the input backward-scattered light and transmits the passed Raman beam to a first optical detector 370 and the Brillouin pass filter 350 passes only a Brillouin scattered light beam included in the input backward-scattered light and transmits the passed Brillouin beam to a second optical detector 380.

If the optical filter unit is constructed as shown in FIGS. 3 and 4, it is possible to separate Raman scattered light and Brillouin scattered light from the backward-scattered light through filtering.

Figure 5:
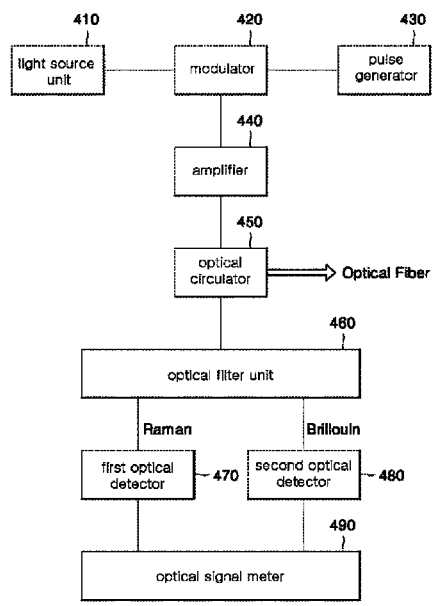
FIG. 5 is a block diagram illustrating a second embodiment of the distributed optical fiber sensor system of the present invention.

FIG. 5 is a block diagram illustrating a second embodiment of the distributed optical fiber sensor system of the present invention.

As shown, the distributed optical fiber sensor system includes a light source unit 410, a modulator 420, a pulse generator 430, an amplifier 440, an optical circulator 450, an optical filter unit 460, a first optical detector 470, a second optical detector 480, and an optical signal meter 490.

In this distributed optical fiber sensor system of the present invention, light output from the light source unit 410 is modulated into pumping pulse light through the modulator 420 and the pulse generator 430 and the pumping pulse light is then transmitted to an optical fiber.

Then, light scattered backward in the optical fiber is separated into a Raman scattered light beam and a Brillouin scattered light beam through the optical filter unit 460 and the Raman scattered light beam and the Brillouin scattered light beam are detected at the first optical detector 470 and the second optical detector 480, respectively.

Then, the optical signal meter 490 measures a change in temperature with respect to the distance from the detected Raman scattered light data and measures a change in the degree of deformation and a change in temperature with respect to the distance from the detected Brillouin scattered light data and measures, based on this measurement information, each of the change in the degree of deformation with respect to the distance and the change in temperature with respect to the distance.

In this embodiment, pumping pulse light is generated while probe light used to determine whether or not the frequency of Brillouin scattered light has been shifted is not generated. In this case, the optical signal meter 490 itself analyzes Brillouin scattered light to measure a change in temperature and a change in the degree of deformation with respect to the distance.

That is, since Brillouin scattered light that is scattered backward in the optical fiber includes not only the pumping pulse light but also an inherent frequency component (10.8 Ghz) due to Brillouin scattering, the optical signal meter 490 analyzes the frequency component to read a change in temperature and a change in the degree of deformation with respect to the distance.

Figure 6:
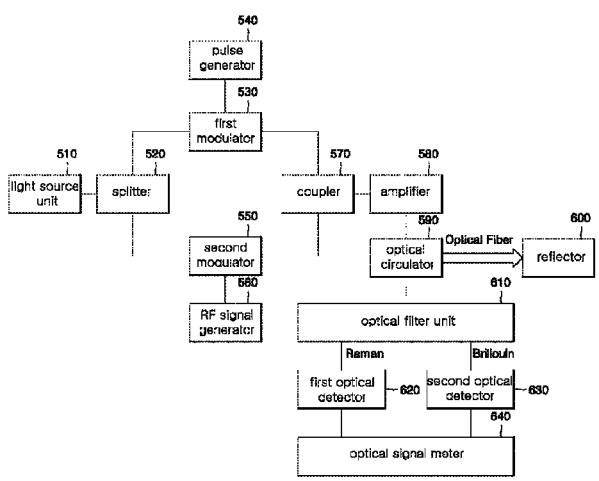
FIG. 6 is a block diagram illustrating a third embodiment of the distributed optical fiber sensor system of the present invention.

FIG. 6 is a block diagram illustrating a third embodiment of the distributed optical fiber sensor system of the present invention.

As shown, the distributed optical fiber sensor system includes a light source unit 510, a splitter 520, a first modulator 530, a pulse generator 540, a second modulator 550, an RF signal generator 560, a coupler 570, an amplifier 580, an optical circulator 590, a reflector 600, an optical filter unit 610, a first optical detector 620, a second optical detector 630, and an optical signal meter 640.

In this distributed optical fiber sensor system of the present invention, light output from the light source unit 510 is distributed and input to the first modulator 530 and the second modulator 550 through the splitter 520.

The light output from the light source unit 510 is modulated into pumping pulse light through the first modulator 530 and the pulse generator 540 and is modulated into probe light through the second modulator 550 and the RF signal generator 560.

The pumping pulse light produced through modulation of the first modulator 530 and the pulse generator 540 and the probe light produced through modulation of the second modulator 550 and the RF signal generator 560 are transmitted to the amplifier 580 through the coupler 570 and are then amplified at the amplifier 580.

The pumping pulse light and the probe light amplified at the amplifier 580 are transmitted to an optical fiber and are then reflected to travel backward by the reflector 600 formed at an end of the optical fiber.

The optical circulator 590 delivers the light scattered backward in the optical fiber to the optical filter unit 610 and the optical filter unit 610 passes a Raman scattered light beam and a Brillouin scattered light beam included in the backward-scattered light.

The Raman scattered light beam and the Brillouin scattered light beam that have passed through the optical filter unit 610 are detected at the first optical detector 620 and the second optical detector 630, respectively.

The optical signal meter 640 measures a change in temperature with respect to the distance from the detected Raman scattered light data and measures a change in the degree of deformation and a change in temperature with respect to the distance from the detected Brillouin scattered light data and measures, based on this measurement information, each of the change in the degree of deformation with respect to the distance and the change in temperature with respect to the distance.

In this embodiment, pumping pulse light and probe light are generated using the single light source unit 510. To accomplish this, the light output from the light source unit 510 is distributed to the first modulator 530 and the second modulator 550 through the splitter 520 and is then modulated into pumping pulse light and probe light respectively through the first modulator 530 and the second modulator 550.

In addition, in this embodiment, since the pumping pulse light and the probe light are transmitted to the optical fiber in the same direction, the reflector 600 is formed at an end of the optical fiber so that the probe light is reflected by the reflector 600 to travel backward, thereby enabling determination as to whether or not the central frequency of the pumping pulse light has been shifted.

Although the present invention has been described with reference to the exemplary embodiments, those having ordinary skill in the art of the invention will appreciate that various modifications can be made to the embodiments, without departing from the scope and spirit of the invention.

Accordingly, the scope of the present invention should not be limited to the embodiments described above, but defined by the accompanying claims and equivalents thereof.

The invention claimed is:

1. A distributed optical fiber sensor system comprising:
an optical modulator for modulating light output from a light source unit into pumping pulse light and transmitting the pumping pulse light to a test optical fiber;
an optical circulator for diverging backward-scattered light that is generated in the test optical fiber;

an optical filter unit for passing Raman scattered light and Brillouin scattered light included in the backward-scattered light diverged at the optical circulator; and a physical quantity change measurement unit for converting each of the Raman scattered light and the Brillouin scattered light that have passed through the optical filter unit into digital data and separately measuring a change in temperature and a change in a degree of deformation with respect to a distance of the test optical fiber using the digital data, wherein the physical quantity change measurement unit analyzes a frequency component due to Brillouin scattering included in the Brillouin scattered light that has passed through the optical filter unit to measure the change in temperature and the change in the degree of deformation with respect to the distance of the test optical fiber.

2. The distributed optical fiber sensor system of claim 1, wherein
the optical modulator is a first optical modulator and the light source unit is a first light source unit, the first optical modulator configured to modulate light output from the first light source unit into a pumping pulse light and transmitting the pumping pulse light to the test optical fiber.

3. The distributed optical fiber sensor system of claim 2, further comprising:
a second optical modulator connected to the optical circulator configured to modulate light output from a second light source unit into a probe light and transmitting the probe light to the test optical fiber.

4. The distributed optical fiber sensor system of claim 3, further comprising:
a splitter disposed between the first light source and the first optical modulator, the splitter configured to diverge light output from the first light source unit, wherein the first optical modulator modulates the light diverged at the splitter into pumping pulse light and the second optical modulator modulates the light diverged at the splitter into probe light;
an amplifier, disposed between the first optical modulator and the optical circulator, the amplifier configured to amplify the pumping pulse light and the probe light and transmitting the amplified pumping pulse light and probe light to a test optical fiber; and
a reflector connected to the optical circulator via the test optical fiber to reflect the probe light received from the optical circulator.

5. The distributed optical fiber sensor system of claim 4, wherein the pumping pulse light and the probe light are transmitted to the amplifier through a coupler.

6. The distributed optical fiber sensor system of claim 3, wherein the second optical modulator includes:
an RF signal generator for generating an RF signal at predetermined frequency intervals from a first frequency to a last frequency in a preset frequency range,
the second optical modulator for modulating the light out from the second light source unit into probe light using the RF signal generator.

7. The distributed optical fiber sensor system according to claim 1, wherein the optical filter unit includes:
a Raman reflected filter for reflecting Raman scattered light included in the backward-scattered light diverged at the optical circulator; and
a Brillouin pass filter for passing only Brillouin scattered light included in the backward-scattered light that has passed through the Raman reflected filter.

8. The distributed optical fiber sensor system according to claim 1, wherein the optical filter unit includes:
a Raman pass filter for passing only Raman scattered light included in the backward-scattered light diverged at the optical circulator;
a Brillouin pass filter for passing only Brillouin scattered light included in the backward-scattered light diverged at the optical circulator; and
a splitter for diverging the backward-scattered light diverged at the optical circulator to the Raman pass filter and the Brillouin pass filter.

9. The distributed optical fiber sensor system according to claim 1, wherein the physical quantity change measurement unit includes:
a first optical detector for detecting Raman scattered light that has passed through the optical filter unit and converting the detected Raman scattered light into digital data and outputting the digital data;
a second optical detector for detecting Brillouin scattered light that has passed through the optical filter unit and converting the detected Brillouin scattered light into digital data and outputting the digital data; and
an optical signal meter for measuring a change in temperature with respect to the distance of the test optical fiber from the data output from the first optical detector, measuring a change in temperature and a change in the degree of deformation with respect to the distance of the test optical fiber from the data output from the second optical detector, and separately outputting the change in temperature and the change in the degree of deformation with respect to the distance of the test optical fiber using the digital data using the measured data.

* * * * *